UNITED STATES PATENT OFFICE.

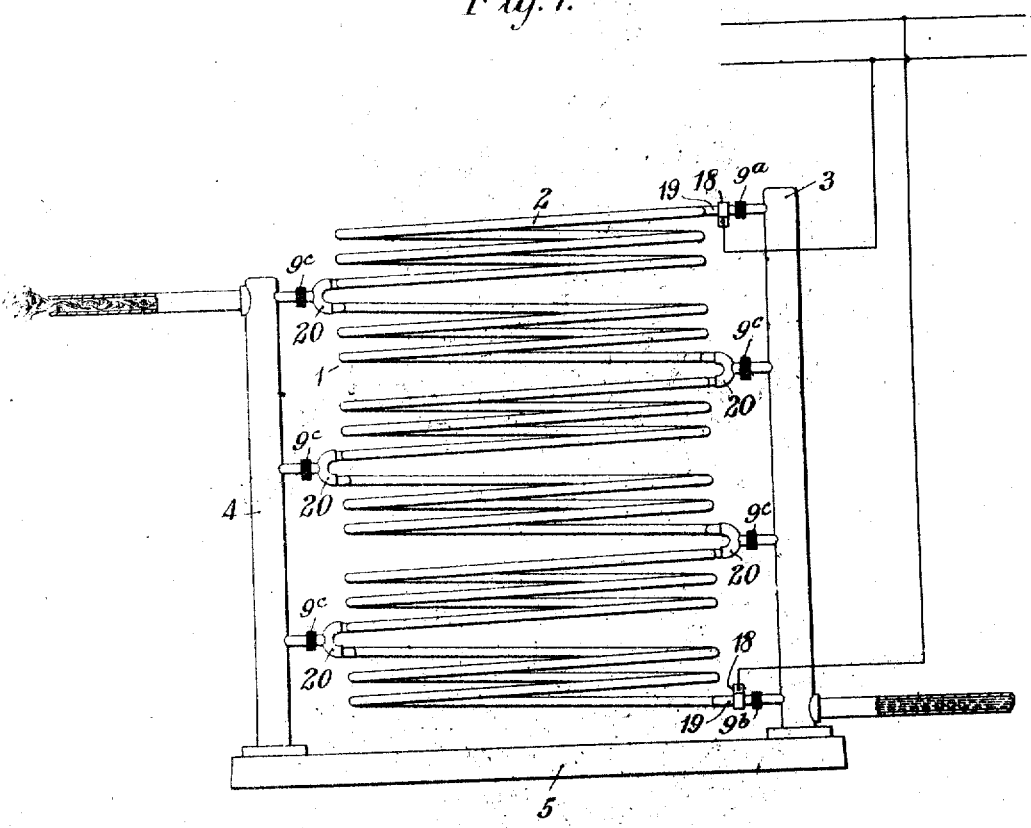

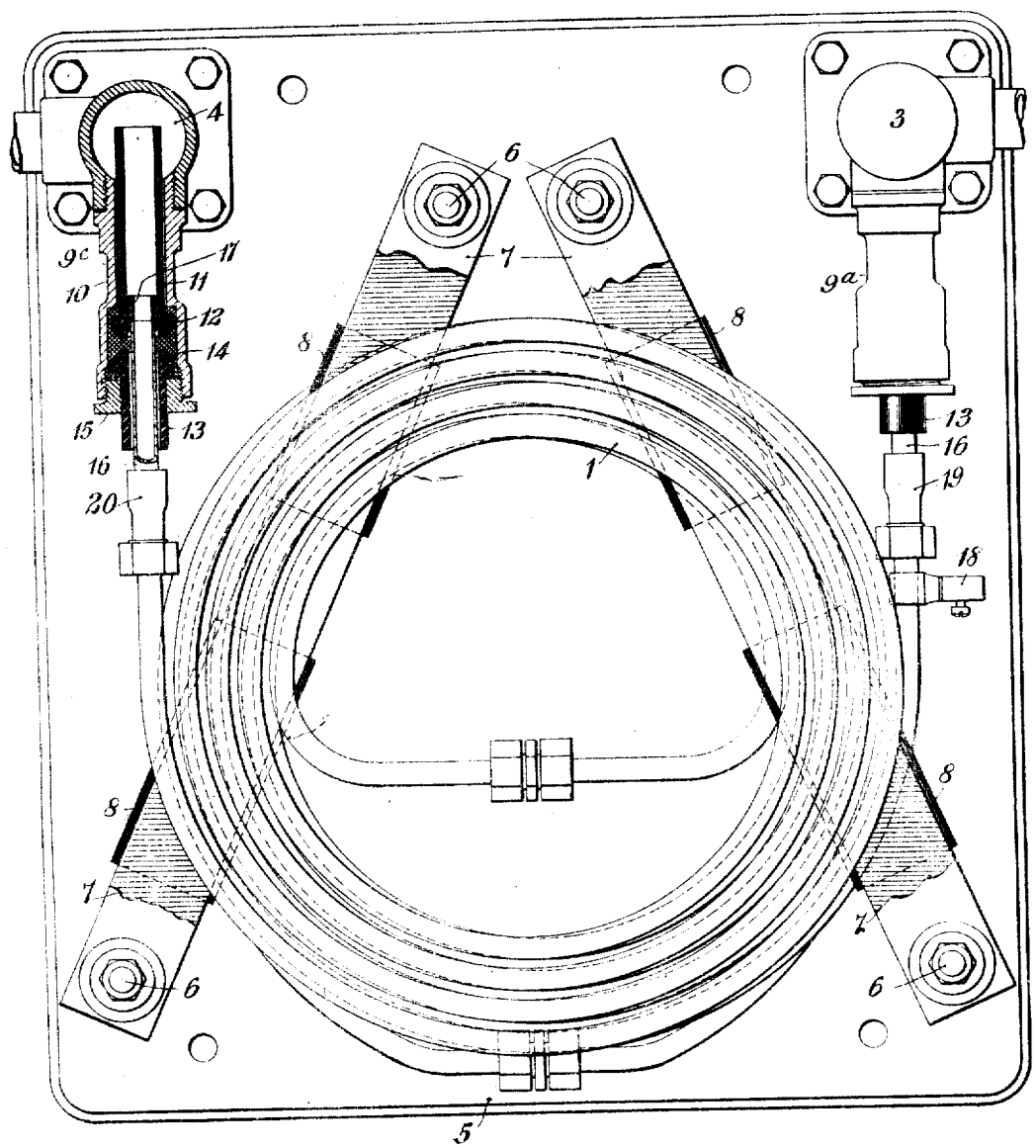

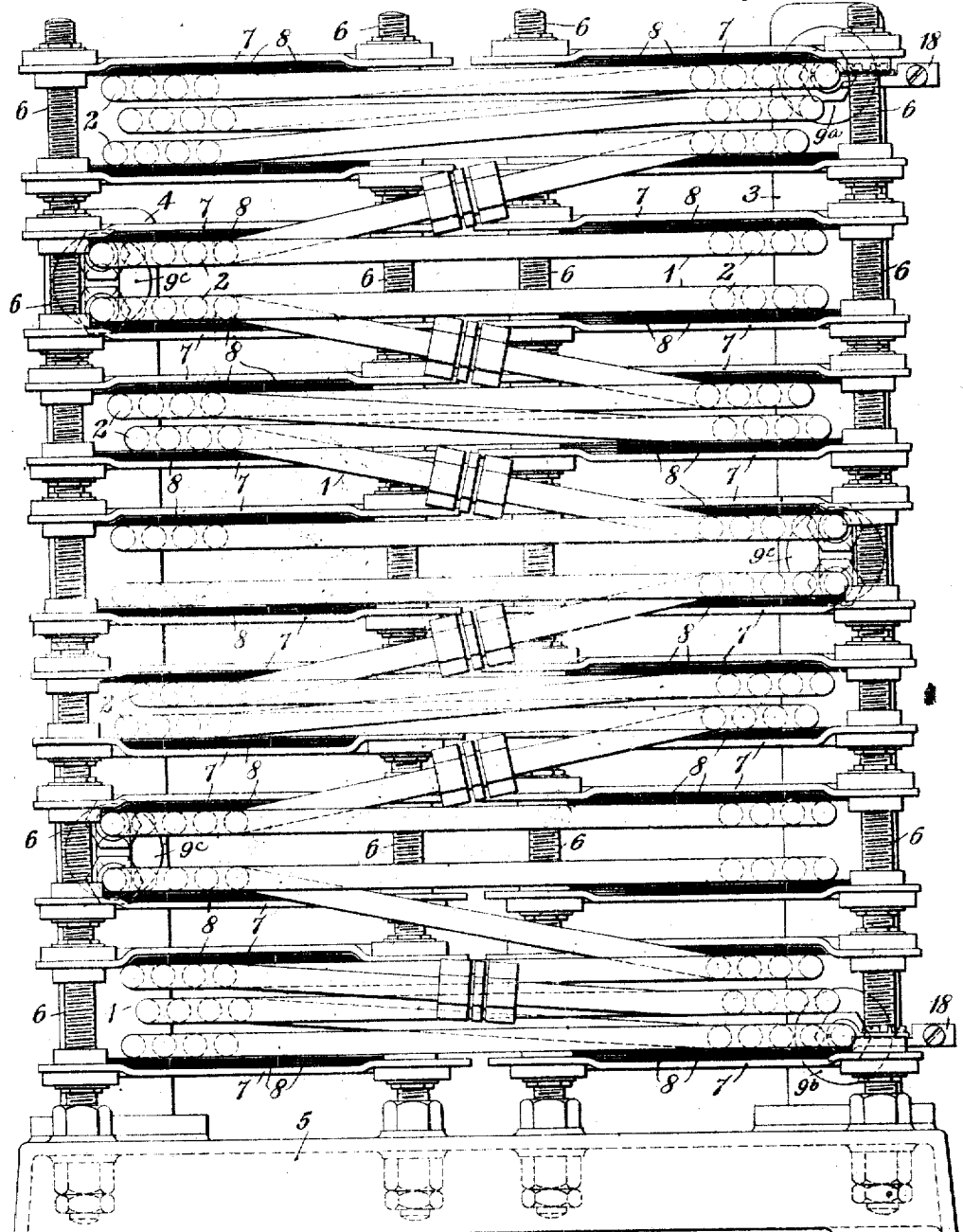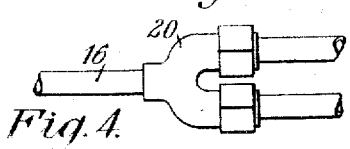

FRANK CONRAD, OF SWISSVALE, PENNSYLVANIA, ASSIGNOR TO WESTINGHOUSE ELECTRIC & MANUFACTURING COMPANY, A CORPORATION OF PENNSYLVANIA.

ELECTRIC HEATING APPARATUS.

No. 912,994.  Specification of Letters Patent.  Patented Feb. 23, 1909.

Application filed June 8, 1907. Serial No. 377,927.

*To all whom it may concern:*

Be it known that I, FRANK CONRAD, a citizen of the United States, and a resident of Swissvale, in the county of Allegheny and State of Pennsylvania, have invented a new and useful Improvement in Electric Heating Apparatus, of which the following is a specification.

My invention relates to electrical heating apparatus and it has for its object to provide a simple, durable and effective device, for heating water and generating steam for various purposes.

When electric and steam locomotives are employed interchangeably for hauling trains of steam heated passenger cars it is necessary to provide a suitable device with which the electric locomotive may be equipped for supplying steam to its train of vehicles in cold weather.

According to my present invention, I provide a steam generator that requires little or no attention from the locomotive driver and may receive its energy, in the form of electric current, from the source which supplies the locomotive driving motors.

Figure 1, of the accompanying drawings, is a diagrammatic view of a system embodying my improved heating device. Fig. 2 is a plan view and Fig. 3 an elevation of a specific device constructed in accordance with my invention, and Fig. 4 is a detail view of the heater shown in Figs. 2 and 3.

Referring to the drawings, the device here illustrated comprises a coil or helix of tubing comprising a plurality of layers or sections of spiral form, the sections being so connected as to form a plurality of fluid-conducting paths in multiple, while all the sections are electrically connected in series.

The steam generator comprises, in detail, a coil or helix 1 of current-conducting tubing having a plurality of layers 2 of spiral form, a supply chamber 3 and a discharge chamber 4, which communicate with the helix at substantially equal intervals throughout their lengths, a base 5, supporting rods 6 and cross bars or strips 7, which are secured to the rods 6 and are insulated from the turns of the conducting tube by spacing blocks 8. At the points of connection between the tube and the supply and discharge chambers, such specially constructed taps $9^a$, $9^b$, and $9^c$ are provided, that the metal tube communicates with the chambers and is at the same time electrically insulated therefrom.

Each of the taps comprises a stuffing box 10 which projects from the wall of the chamber with which it communicates, and is provided with an insulating sleeve 11 having an end flange or collar 12, the outer extremity of the stuffing box being counter-bored to receive this flange or collar. A second insulating sleeve 13, having an end flange 14, is secured to the stuffing box by a bushing 15 which is fitted over the tube to engage the flange 14 and is screw-threaded into the outer extremity of the stuffing box. A short length of pipe 16 which is adapted to connect the stuffing box with the tube 1, extends through the sleeve 13 and enters the sleeve 11 for a short distance. Suitable steam-packing is introduced into the stuffing box around the pipe 16 and between the ends of the insulating tubes. In this way, steam-tight joints are formed between the chambers 3 and 4 and the conducting coil or helix 1, and, at the same time, the two members are electrically insulated from each other.

The inner end of the pipe 16 is provided with a tip or sleeve 17 formed of carbon or other conducting material that is capable of resisting the destructive electrolytic action produced by the leakage of electric current from the helix 1, through the water or other liquid which may be flowing therein, to the walls of the chambers 3 and 4. The number of taps, similar to that illustrated in section in Fig. 2, which may be employed in the construction of a specific heating device will depend upon the length, size and material of the tube 1 and upon the electrical voltage for which the device is constructed.

The taps $9^a$ and $9^b$ are joined to the extremities of the coil or helix 1 by pipe connectors 19 while the taps $9^c$ connect intermediate points in the helix and consequently the ends of two tube sections are joined to the taps by double pipe connections 20 such as that illustrated in Fig. 4.

Electrical connections are established through terminals 18 and, as illustrated in Fig. 1 of the drawings, the entire length of the tube 1 is connected in series with the line. I desire, however, that my invention shall not be restricted in this regard since the electrical connections may, of course, be varied and it is also to be understood that modifications in the size and arrangement of details of the device itself may be effected within the scope of my invention.

I claim as my invention:

1. An electric heating device comprising a helix of fluid-containing tubing, pressure heads or chambers communicating therewith, and insulating sleeves interposed between the heads and the tubing.

2. An electric heating device comprising a helix of fluid-containing, electric-current-conducting tubing, pressure heads or chambers communicating therewith, insulating sleeves interposed between the heads and the tubing, and tips or sleeves at the extremities of the tubing, said sleeves being formed of conducting material adapted to resist electrolytic action.

3. An electric heating device comprising a helix of fluid-containing, electric-current-conducting tubing, pressure heads or chambers communicating therewith, insulating sleeves interposed between the heads and the tubing, and carbon tips or sleeves at the ends of the tubing.

4. In an electric heating device, the combination with a fluid-containing metal tube, of tips or sleeves for the tube which form a channel or channels through which the fluid must pass in entering and leaving the tube, said members being adapted to resist the destructive electrolytic action resulting from a leakage of electric energy through the fluid-containing tube.

5. In an electric heating device, the combination with a supply chamber and a discharge chamber, a helix of conducting tubing, and a plurality of taps for establishing communication between the chambers and the helix, of means for insulating the chamber walls from the helix.

6. An electric heating device comprising admission and discharge chambers, a fluid-containing helix of conducting tubing, a plurality of short pipes that communicate with the helix at end and intermediate points, and means for establishing communication between the pipes and the chambers and for electrically insulating the pipes from the chambers.

7. An electric heating device comprising a base, fluid-pressure admission and discharge chambers secured thereto, a helix of conducting tubing, means for supporting and insulating the helix from the base, short pipes communicating with the helix at end and intermediate points, and means for electrically insulating the pipes from the chambers and for establishing communication between said parts.

8. An electric heating device comprising a base, fluid-pressure admission and discharge chambers secured thereto, a helix of conducting tubing, means for supporting and insulating the helix from the base, short pipes communicating with the helix at end and intermediate points, means for electrically insulating the pipes from the chambers and for establishing communication between said parts, and tips or sleeves at the extremities of the pipes, said sleeves being formed of conducting material adapted to resist destructive electrolytic action.

9. An electric heating device comprising a base, fluid-pressure admission and discharge chambers secured thereto, a helix of conducting tubing, means for supporting and insulating the helix from the base, short pipes communicating with the helix at end and intermediate points, means for electrically insulating the pipes from the chambers and for establishing communication between said parts, and carbon tips or sleeves at the ends of the pipes.

10. An electric heating device comprising admission and discharge chambers, a conducting tube and taps establishing communication between the tube and the chambers, said taps comprising insulating tubes or sleeves for electrically separating the tube from the chamber walls, and stuffing boxes for providing a tight joint between them.

In testimony whereof, I have hereunto subscribed my name this 31st day of May, 1907.

FRANK CONRAD.

Witnesses:
C. AALBORG,
BIRNEY HINES.